United States Patent [19]

Bäro et al.

[11] Patent Number: 5,400,827
[45] Date of Patent: Mar. 28, 1995

[54] METALLIC SLEEVE FOR BRIDGING A LEAKAGE POINT ON A PIPE

[75] Inventors: Günter Bäro, Weinheim; Jakob Russ, Römerberg, both of Germany

[73] Assignee: ABB Reaktor GmbH, Mannheim, Germany

[21] Appl. No.: 133,466

[22] Filed: Oct. 8, 1993

Related U.S. Application Data

[63] Continuation-in-part of Ser. No. 669,771, Mar. 15, 1991, abandoned.

[30] Foreign Application Priority Data

Mar. 15, 1990 [DE] Germany ............. 40 08 252.0
Apr. 6, 1990 [DE] Germany ............. 40 11 136.9

[51] Int. Cl.⁶ .................................. F16L 55/16
[52] U.S. Cl. .................................. 138/98; 138/97; 138/89; 165/76; 29/402.09
[58] Field of Search ............ 138/97, 98, 103, 89, 138/110; 29/447, 402.09, 523; 165/71, 76

[56] References Cited

U.S. PATENT DOCUMENTS

| | | |
|---|---|---|
| Re. 30,802 | 11/1981 | Rogers, Jr. . |
| 5,01,559 | 4/1992 | Gelpi et al. . |
| 3,900,939 | 8/1975 | Greacen . |
| 4,303,103 | 12/1981 | Marks et al. ............. 138/97 |
| 4,346,922 | 8/1982 | Ohtsuga et al. ............. 138/97 |
| 4,592,577 | 6/1986 | Ayres et al. . |
| 4,754,538 | 7/1988 | Stewart . |
| 4,793,382 | 12/1988 | Szalvay ............. 138/98 |
| 4,819,315 | 4/1989 | Cartry et al. . |
| 4,847,967 | 7/1989 | Gaudin . |
| 5,022,437 | 6/1991 | Pötz et al. . |
| 5,189,789 | 3/1993 | Hall ............. 138/97 |

FOREIGN PATENT DOCUMENTS

52-28758 3/1977 Japan .
57-15639 1/1982 Japan .

*Primary Examiner*—James E. Bryant, III
*Attorney, Agent, or Firm*—Herbert L. Lerner; Laurence A. Greenberg

[57] ABSTRACT

A metallic sleeve for bridging a leakage point on a pipe is expanded onto the inner wall surface of the pipe with the aid of an expansion technique. During the expansion process, a gap of approximately 5 to 10 μm occurs between the pipe and the sleeve due to the elastic resilience of the deformed materials. In order to prevent leakage through this gap, the peripheral surface of the end regions of the sleeve carry a component made of a shape-memory alloy which forms a seal between the sleeve and the pipe when a given temperature is reached. The sleeve is used primarily during the repair of heat exchanger tubes.

10 Claims, 4 Drawing Sheets

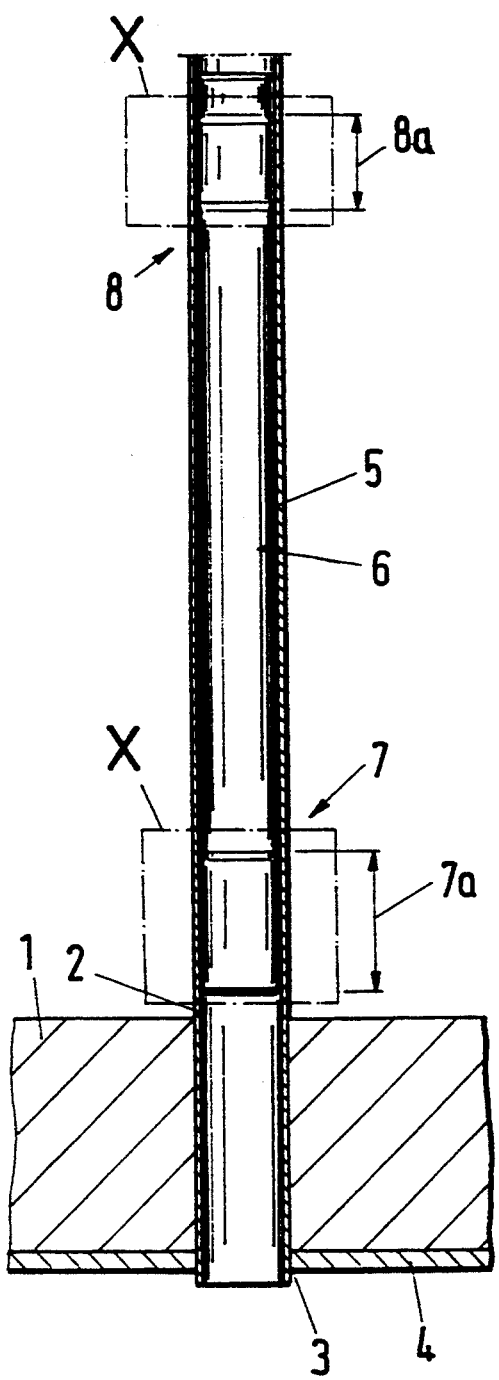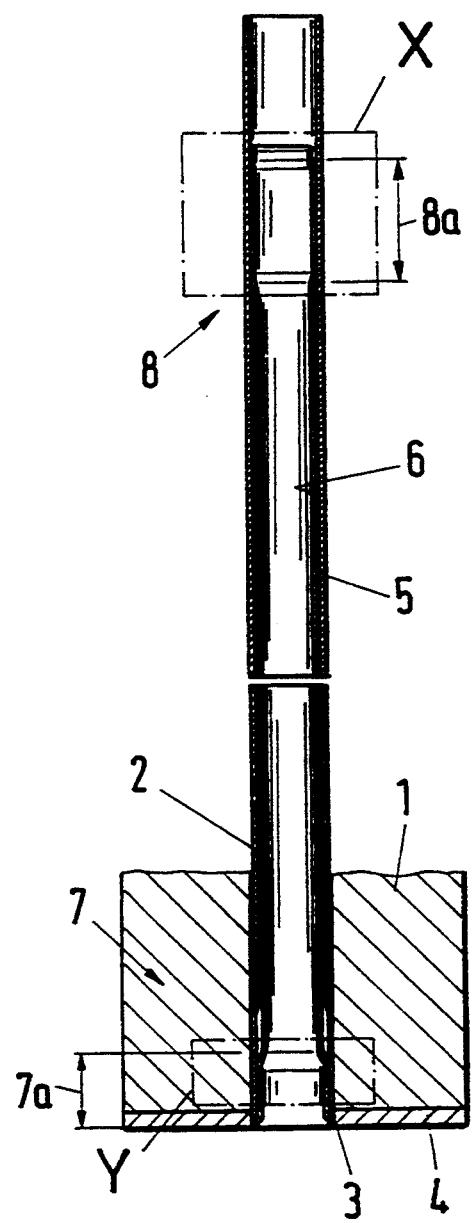

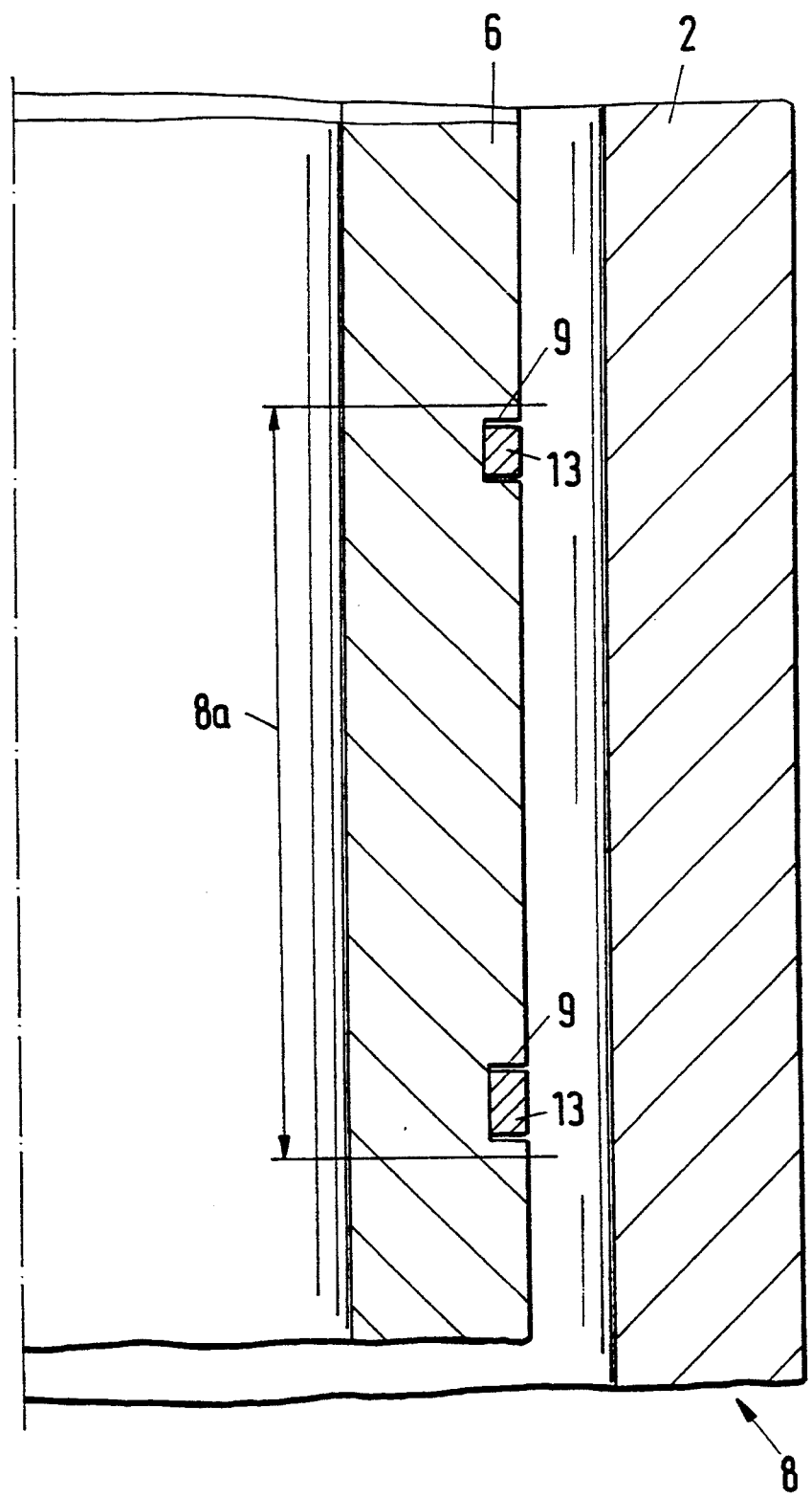

METALLIC SLEEVE FOR BRIDGING A LEAKAGE POINT ON A PIPE

Reference to Related Application

This application is a continuation-in-part of application Ser. No. 07/669,771, filed Mar. 15, 1991, now abandoned.

BACKGROUND OF THE INVENTION

1. Field of the Invention

The invention relates to a metallic sleeve for bridging a leakage point on a pipe or tube, wherein the sleeve can be placed on the inner wall surface of the pipe with the aid of an expansion technique.

2. Description of the Related Art

Such a sleeve is known from Published European Application No. 00 47 407. In that publication, the sleeve has partial regions provided with toothing near its top and bottom ends. After the toothing has penetrated into the pipe wall in a first stage by hydraulic expansion of the regions, the region located between the toothings is likewise hydraulically expanded in a second stage. A shrinking process which thereby occurs in the axial direction is intended to reinforce the connection between the pipe and the sleeve in the vicinity of the toothing. Due to the different elastic resilience of the deformed materials which depends, inter alia, on the different deformation paths of the pipe and the sleeve, a gap of approximately 5 to 10 sm occurs between the pipe and the sleeve during the expansion process. Therefore, small quantities of leakage have to be tolerated. If the leakage is to be suppressed completely, the sleeve ends have previously been required to be welded to the pipe.

The welding constitutes a heat treatment which can lead to undesired stresses, and moreover increases the time spent on pipe repairs. Furthermore, the formation of corrosion in the gap cannot be assessed.

A device for reconstructing spigot-and-socket joint piping is also known from the German journal gwf-Gas-/Erdgas (1975), No. 10, pages 412 to 417. In that publication, the leaking point in the region of the spigot-and-socket joint is sealed with the aid of an adhesive-coated aluminum backing foil. By using an inflatable diaphragm, the aluminum foil is brought into contact with the inside wall of the pipe until adhesive bonding has been achieved. The use of adhesive permits the known method to be used only in those cases where the adhesive is not attacked by the medium flowing in the piping.

SUMMARY OF THE INVENTION

It is accordingly an object of the invention to provide a metallic sleeve for bridging a leakage point on a pipe, which overcomes the hereinafore-mentioned disadvantages of the heretofore-known devices of this general type, which allows a leakage-tight connection to the pipe without welding and which can be used independently of the medium flowing in the piping, i.e. which is not subject to chemical attack due to the medium (e.g. adhesive).

With the foregoing and other objects in view there is provided, in accordance with the invention, a metallic sleeve for bridging a leakage point on a pipe carrying a fluid at a given operating temperature, comprising a sleeve body having an outer peripheral surface to be expanded against an inner wall surface of the pipe for bridging a leakage point on the pipe, and a plurality of components formed of a shape-memory alloy disposed at the outer peripheral surface and forming a seal between the sleeve body and the pipe when a temperature of the components reaches the operating temperature.

The component made of a shape-memory alloy executes the expansion movement of the sleeve, which results in a gap being present between the sleeve or the component made of the shape-memory alloy and the pipe, after the expansion process has been completed and the spring-back has taken place. When the pipe is heated to a certain temperature that is still below the operating temperature of the pipe, the shape-memory alloy, which is set to the operating temperature, is expanded due to the shape-memory effect in order to produce a seal between the sleeve and the pipe.

The main object of the instantly described invention is to provide a seal for a pipe leak. More particularly, the important object of the invention is to overcome the problem associated with the spring-back effect. The spring-back effect, as mentioned, causes a gap of about 5 to 10 μm in the expanded seal. The term "shape-memory alloy" defines a structural property. A component formed of a shape-memory alloy will attempt to reach its original form when a given temperature is reached. It is thereby understood that the alloy will start its expansion (during heating) towards its "hot shape" well below the temperature to which it is set. In other words, the alloy will expand against the pipe surface and form the required seal at a temperature which is still well below the operating temperature. It must be understood that the desired sealing effect is achieved when the component expands towards it original shape. The original shape is thereby the shape of the alloy at the operating temperature, to which the alloy is set. The original shape, however, is not reached when the alloy component abuts the surface of the pipe and the sleeve. In other words, when the pipe prevents the alloy component from reaching its original shape, there will be a surface pressure between the pipe and the component which results in an effective seal. The surface pressure is again reduced as the shape-memory alloy is cooled from the operating temperature and the tight seal is lost altogether when the alloy cools below the given temperature. Finally, in the cool state, the gap of 4 to 10 μm caused by the spring-back effect will again be reached.

The "shape-memory alloy" of the claims is thus defined to include the "reversible transformation state" below the operating temperature, as explained above.

In accordance with another feature of the invention, the outer peripheral surface of the sleeve body has a recess formed therein in which the components are disposed, the outer peripheral surface of the sleeve body between the components is roughened with a profile depth of substantially between 0.02 and 0.05 mm, the components and the roughened outer surface have the same outside diameter, and the roughened outer surface has a greater surface hardness than the pipe.

In accordance with a further feature of the invention, the components are turns of a spiral having a greater outside diameter than the sleeve body, and there is provided a layer disposed on the outer periphery of the sleeve body between the spiral turns for evening out projections.

In accordance with an added feature of the invention, the sleeve body has end regions, each of the components is disposed at a respective one of the end regions for sealing the end regions to the pipe when the given temperature is reached, and the sleeve body has an end facing away from a respective one of the components with an expansion region having a part with a lower surface hardness and a part with a greater surface hardness than the pipe, the part with the greater surface hardness being having a profiling.

This structure is used whenever one end of the sleeve has to be introduced into a pipe part extending outside a tube sheet and the other end thereof has to be introduced into a pipe part extending into a tube sheet of a heat exchanger. The differences in the resilience in the vicinity of the tube sheet are negligible, with the result that the use of a component made of a shape-memory alloy is not required in such a case.

In accordance with an additional feature of the invention, the components are closed rings, or are formed of wire, or are portions of a sheet metal strip.

In accordance with a concomitant feature of the invention, the components are turns of a spiral having a greater outside diameter than the sleeve body, and there is provided a layer extending over the spiral for filling and evening-out spaces between the spiral turns.

Other features which are considered as characteristic for the invention are set forth in the appended claims.

Although the invention is illustrated and described herein as embodied in a metallic sleeve for bridging a leakage point on a pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a fragmentary, diagrammatic, longitudinal-sectional view of a sleeve used in a pipe region above a tube sheet of a heat exchanger;

FIG. 2 is a view similar to FIG. 1 of a sleeve used in the region of the tube sheet and above the tube sheet;

FIG. 4 is a view similar to FIG. 3 showing another form of the embodiment according to FIG. 3;

DESCRIPTION OF THE PREFERRED EMBODIMENTS

Figure 3:
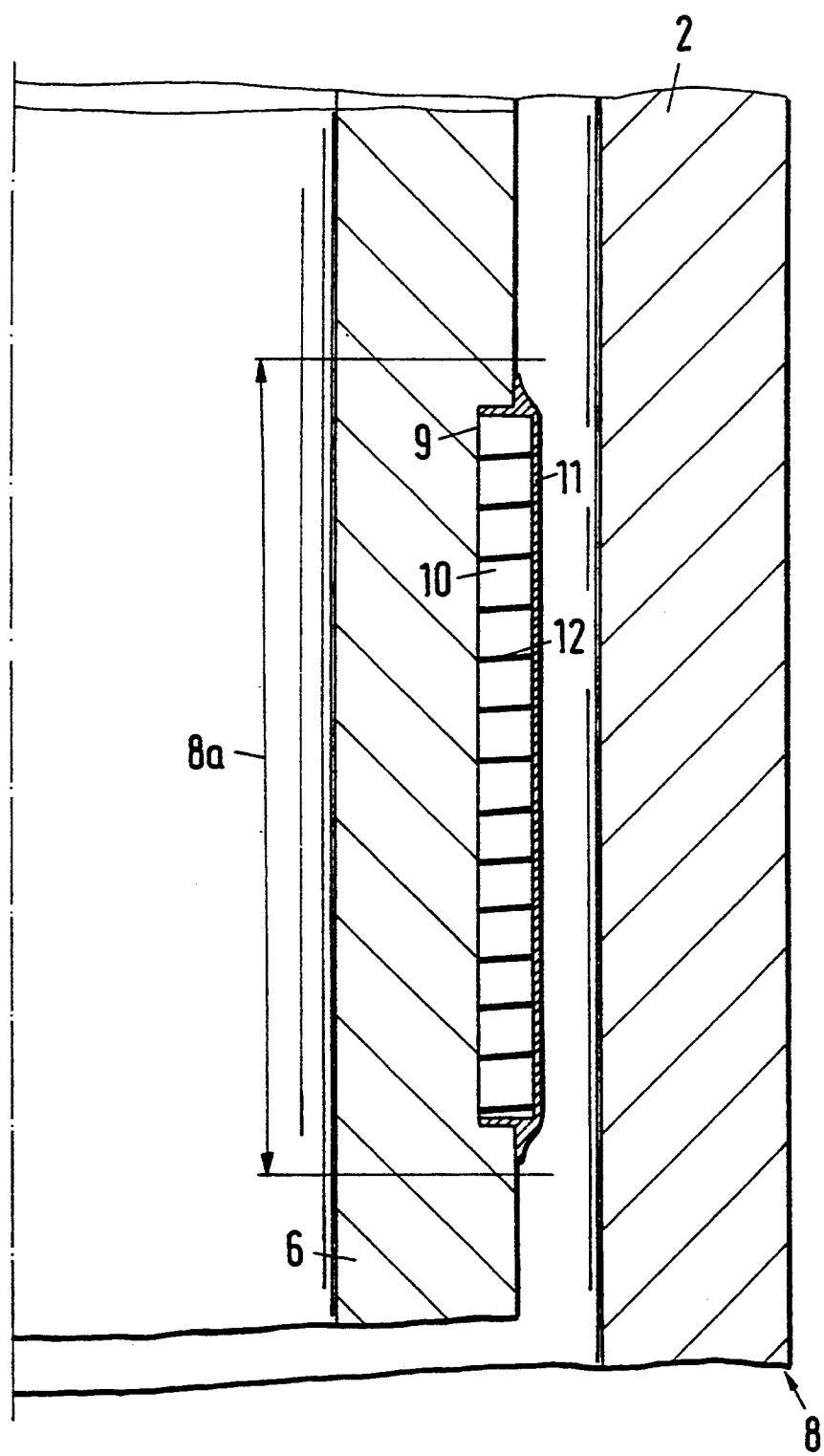
FIG. 3 is an enlarged view of a portion "X" of FIGS. 1 and 2 prior to an expansion process.

Referring now to the figures of the drawing in detail and first, particularly, to FIG. 1 thereof, there is seen a partial region of a tube sheet 1 of a heat exchanger, which is not shown in detail. A multiplicity of pipes or tubes 2 ends in the tube sheet, although only one pipe is illustrated. The illustrated pipe 2 is connected by a weld 3 to a plating 4 of the tube sheet 1. A sleeve 6 which is introduced into the pipe 2 for bridging a leakage point 5 on the pipe 2, has a sleeve body with end regions 7, 8 connected to a region of the pipe 2 situated above the tube sheet 1 by expansion. For example, particularly when the sleeve 6 is expanded hydraulically in a region outside the tube sheet 1, a different spring-back occurs in the pipe 2 and the sleeve 6 which is expressed by a gap of approximately 5 to 10 μm that arises at the expanded end regions 7, 8 between the pipe 2 and the sleeve 6 upon completion of the expansion process.

According to FIG. 2, the sleeve 6 is expanded with one end region 7 thereof in the vicinity of the tube sheet 1 and with another end region 8 thereof in a region outside the tube sheet.

FIG. 3, which is illustrated on an enlarged scale, shows the structure of the end regions 7 and 8 of the sleeve 6 according to FIG. 1 and of the end region 8 of the sleeve 6 according to FIG. 2 in the portions "X", prior to its expansion. An expansion region 8a in FIGS. 1-3 and 7a in FIG. 1, has a recess, turned face or grooving 9 which is approximately 0.2 mm deep, in which a component is placed in the form of a spiral. The component is constructed as a sheet metal strip 10 which is made of a shape-memory alloy. A layer 11 which is approximately 0.2 mm thick covers the spiral-shaped component 10. A gap between the pipe 2 and the outside of the layer 11 is approximately 0.3 mm prior to the expansion. After the expansion process, which is not illustrated in FIG. 3, the spring-back explained above takes place and leads to a gap width of approximately 5 to 10 sm between the pipe 2 and the sleeve 6.

The characteristic of the shape-memory alloy is selected in such a way that it expands into its "hot shape" upon reaching the operating temperature of the heat exchanger. It is understood, as explained above, that the alloy starts its expansion well below the operating temperature, so that a seal between the sleeve and the pipe is established upon heating even before the alloy has reached the operating temperature. For the purpose of defining this invention, one may define three different temperatures. A cold state or low temperature state is the one in which the shape-memory alloy is "small", i.e. the above-described gap (4–10 μm) exists. When the components are heated from the cold state (to the final operating temperature), they pass through a medium temperature, also defined as the given temperature. The medium temperature is the one in which the shape-memory alloy has already expanded and formed a seal with the pipe. At the medium temperature, the seal is not yet very strong. When the components are further heated, they reach the operating temperature, the hot temperature. The shape-memory alloy is set to that temperature and it attempts to attain its "hot shape". This "attempt" is expressed in an expansion force which the alloy components exert on the inner pipe wall surface. That expansion force acts between the pipe wall and the sleeve wall (Newton's third law) and thus forms a rigid seal.

The layer 11 inserted in between the pipe 2 and the sleeve 6 thus bridges and seals the gap. In a component constructed as a sheet metal strip 10 and made of the shape-memory alloy, the layer 11 effects a closure of a space 12 between spindle turns of the sheet metal strip 10 against the occurrence of leakage, in addition to its corrosion-proof covering. A leaking medium could, for example, penetrate into the space 12 at one end and then pass along the spiral-shaped turns bounding the space 12 into the expansion region, in the axial direction of the sleeve. If the corrosion-proof coating can be omitted, the application of the layer 11 in the space 12 alone is sufficient for preventing a leakage from passing through. Thus the layer 11 thereby does not overlap the sheet metal strip 10.

According to the structure illustrated in FIG. 4, the expansion region 8a assigned to the end region 8 has at least one closed ring 13 made of a shape-memory alloy. With regard to the spiral-shaped structure described according to FIG. 3, there can be no leakage passing through with the structure of FIG. 4. Therefore, a layer 11 would be required at best for corrosion-proofing purposes in the exemplary embodiment according to FIG. 4. The rings 13 can be constructed both in the form of wire and as a sheet metal strip. It is only significant that the change in thickness thereof induced by the shape-memory effect is of sufficiently large dimensions to reliably bridge the gap occurring due to the springback when the predetermined temperature is reached.

Figure 5:
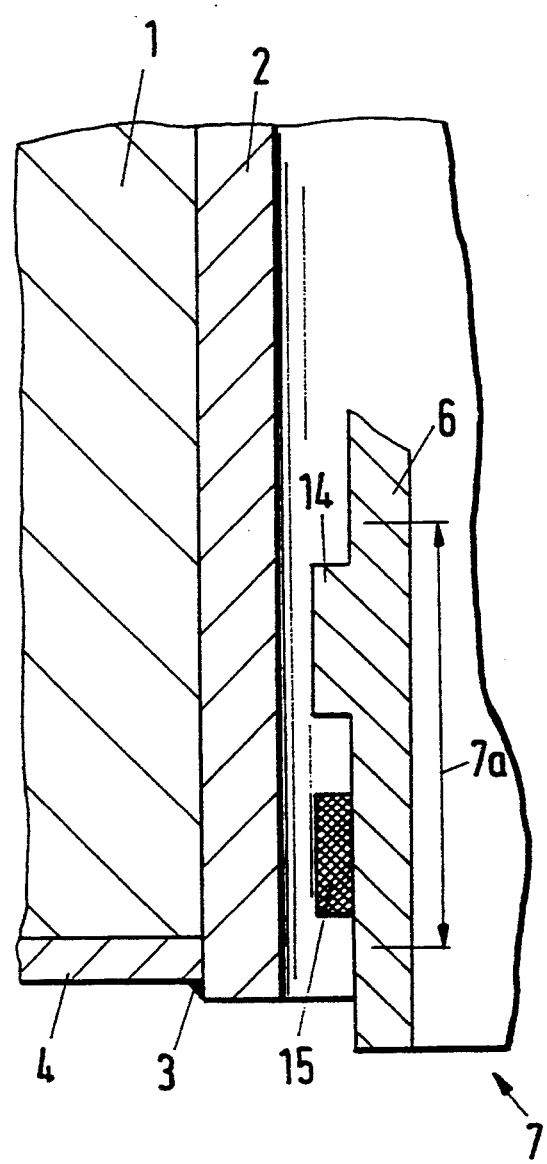
FIG. 5 is an enlarged view of a portion "Y" of FIG. 2.

The structures according to FIGS. 3 and 4 can be used for the portions "X" according to FIGS. 1 and 2, which provide expansion outside the tube sheet 1. If one end of the sleeve 6 extends into the tube sheet 1, the expansion region 7a is constructed in accordance with FIG. 5. According to FIG. 5, a semi-section shows the sleeve 6 with its expansion region 7a prior to the expansion process, on an enlarged scale. Inside the expansion region 7a, the sleeve 6 is provided with a collar 14 which constitutes a part having a lower surface hardness than that of the pipe 2. A layer 15 is applied below the collar 14. The layer 15 has a profiling or contour and constitutes a part having a greater surface hardness than that of the pipe. In order to be able to give a better illustration of the outer surface construction of the expansion region 7a, the collar 14 and the layer 15 are drawn in an oversized manner. In reality, the collar 14 projects approximately 0.05-0.1 mm beyond the remaining outer surface of the sleeve 6 and has a width of approximately 10 mm. Like the collar 14, the layer 15 which is preferably sprayed on, also projects 0.05 to 0.1 mm beyond the remaining outer surface of the sleeve 6 and has a width of approximately 7 mm. The profile depth of the profiling of the layer 15 is approximately 0.01 to 0.05 mm. During the expansion process, the material mass of the collar 14 is compressed in such a way that it is virtually no longer present. The change in yield point in the material of the hollow-cylindrical part due to the compression, simultaneously causes an increase in the force-locking connection between the sleeve 6 and the pipe 2. A force-locking connection is one which connects two elements together by force external to the elements, as opposed to a form-locking connection which is provided by the shapes of the elements themselves. During the expansion process, the profiling of the layer 15 having a greater hardness than the inner wall 2, penetrates as far (namely 0.01 to 0.05 mm) into the inner wall surface of the pipe as is predetermined by the deformation process of the collar 14 and thus causes a form locking between the sleeve and the pipe.

Figure 6:
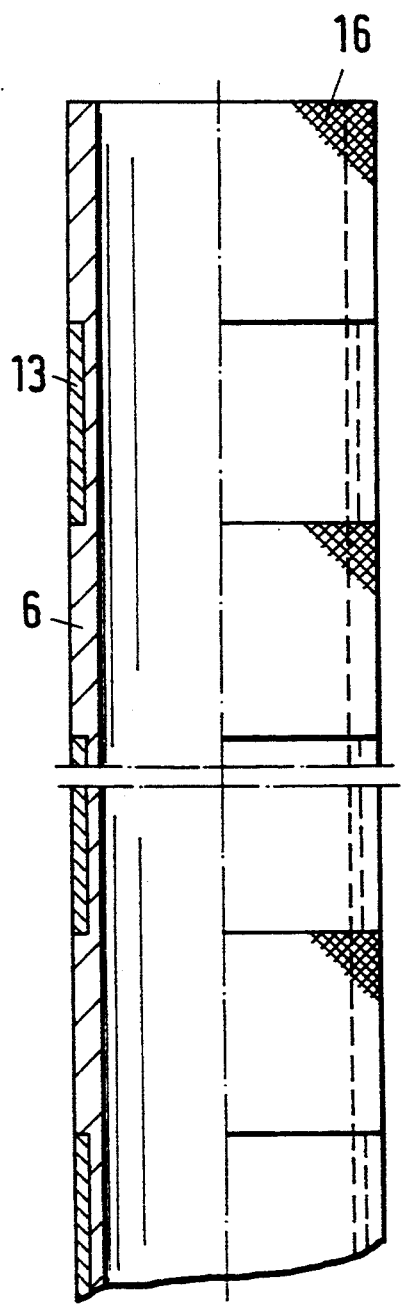
FIG. 6 is a fragmentary, sectional view showing another form of the embodiment according to FIG. 5.

FIG. 6 is illustrated as a semi-section on an enlarged scale which reveals a fine-pored structure of a profiling 16 that can be constructed in the form of a knurl overlapping in a crossed manner. The connection to the pipe 2 is achieved by relatively small expansion forces per unit of area, since a maximum penetration depth of 0.05 mm is sufficient for a reliable connection due to the large profile surface. The small expansion forces therefore also rule out pipe damage if the sleeve 6 is expanded above the tube sheet 1. The fine-pored structure of the profiling 16 is interrupted by annular components 13 made of a shape-memory alloy which are embedded or let into the outer surface of the sleeve 6 at predeterminable intervals. The region provided with the profiling 16 has the same outside diameter as the components 13. For reasons of better illustration, the thickness of the components 13 is illustrated on a larger scale. As a rule it is approximately 0.2 mm, with the result that these components can be constructed as a sheet metal strip. When the expansion of the sleeve has been completed and a predetermined temperature has been reached, the components 13 bridge the gap caused by the springback and seal it completely against leakage.

We claim:

1. A metallic sleeve for bridging a leakage point on a pipe carrying a fluid at a given operating temperature, comprising a sleeve body having an outer peripheral surface to be expanded against an inner wall surface of a pipe for bridging a leakage point on the pipe, and a plurality of components formed of a shape-memory alloy disposed at said outer peripheral surface, said components including means for expanding against the inner wall surface of the pipe and forming a seal between said sleeve body and the pipe as a temperature of said components reaches the given operating temperature.

2. The metallic sleeve according to claim 1, wherein said outer peripheral surface of said sleeve body has a recess formed therein in which said components are disposed, said outer peripheral surface of said sleeve body between said components is roughened with a profile depth of substantially between 0.02 and 0.05 mm, said components and said roughened outer surface have the same outside diameter, and said roughened outer surface has a greater surface hardness than the pipe.

3. The metallic sleeve according to claim 1, wherein said components are turns of a spiral having a greater outside diameter than said sleeve body, and including a layer disposed on said outer periphery of said sleeve body between said spiral turns for evening out projections.

4. The metallic sleeve according to claim 1, wherein said sleeve body has end regions, each of said components is disposed at a respective one of said end regions for sealing said end regions to the pipe when the given temperature is reached, and said sleeve body has an end facing away from a respective one of said components with an expansion region having a part with a lower surface hardness and a part with a greater surface hardness than the pipe, said part with the greater surface hardness being having a profiling.

5. The metallic sleeve according to claim 1, wherein said components are closed rings.

6. The metallic sleeve according to claim 1, wherein components are formed of wire.

7. The metallic sleeve according to claim 1, wherein said components are portions of a sheet metal strip.

8. The metallic sleeve according to claim 1, wherein said components are turns of a spiral having a greater outside diameter than said sleeve body, and including a layer extending over said spiral for filling and evening-out spaces between said spiral turns.

9. A metallic sleeve for bridging a leakage point on a pipe provided for carrying a fluid at a given temperature, comprising a sleeve body having an outer peripheral surface to be expanded against an inner wall surface of a pipe for bridging a leakage point on the pipe, and at least one component formed of a shape-memory alloy disposed at said outer peripheral surface, said at least one component including means for expanding against the inner wall surface of the pipe and forming a seal between said sleeve body and the pipe as a temperature of said at least one component reaches the given temperature.

10. In combination,
a pipe carrying a fluid at a given operating temperature, said pipe having an inner wall surface; and
a metallic sleeve for bridging a leakage point on said pipe, said metallic sleeve comprising a sleeve body having an outer peripheral surface expanded against said inner wall surface of said pipe for bridging the leakage point on the pipe, and a shape-memory alloy component disposed at said outer peripheral surface, said shape-memory alloy component including means for expanding against said inner wall surface and forming a seal between said sleeve body and said pipe as the given operating temperature is reached.

* * * * *